United States Patent
Komura et al.

(10) Patent No.: US 12,506,327 B2
(45) Date of Patent: Dec. 23, 2025

(54) ILLUMINATION DEVICE

(71) Applicant: Magnolia White Corporation, Tokyo (JP)

(72) Inventors: Shinichi Komura, Tokyo (JP); Koichi Okuda, Tokyo (JP); Ken Onoda, Tokyo (JP); Hiroaki Kijima, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 685 days.

(21) Appl. No.: 17/962,548

(22) Filed: Oct. 10, 2022

(65) Prior Publication Data

US 2023/0114307 A1 Apr. 13, 2023

(30) Foreign Application Priority Data

Oct. 13, 2021 (JP) .................. 2021-168182

(51) Int. Cl.
*H01S 5/40* (2006.01)

(52) U.S. Cl.
CPC .......... *H01S 5/4093* (2013.01); *H01S 5/4075* (2013.01)

(58) Field of Classification Search
CPC .............................. H01S 5/4093; H01S 5/4075
See application file for complete search history.

(56) References Cited

U.S. PATENT DOCUMENTS

| 8,416,363 B2 * | 4/2013 | Shikii | G02B 6/0028 |
| | | | 362/626 |
| 2018/0143440 A1 * | 5/2018 | Cheng | H04N 13/346 |
| 2019/0371971 A1 | 12/2019 | Kozuru et al. | |

FOREIGN PATENT DOCUMENTS

JP 2019-212752 A 12/2019

* cited by examiner

*Primary Examiner* — Sung H Pak
(74) *Attorney, Agent, or Firm* — XSENSUS LLP

(57) ABSTRACT

According to one embodiment, an illumination device includes a light guide including an upper surface, a lower surface and a light entering surface, a first light emitting portion, a second light emitting portion, and a third light emitting portion. A first surface, a second surface, a third surface and a fourth surface of the upper surface are arranged in this order in a first direction. A width of the first surface is less than a width of the second surface, and the width of the second surface is less than a width of the third surface. An angle between the light entering surface and the first surface is an acute angle. The first light emitting portion, the second light emitting portion and the third light emitting portion face the light entering surface.

13 Claims, 10 Drawing Sheets

ILLUMINATION DEVICE

CROSS-REFERENCE TO RELATED APPLICATIONS

This application is based upon and claims the benefit of priority from Japanese Patent Application No. 2021-168182, filed Oct. 13, 2021, the entire contents of which are incorporated herein by reference.

FIELD

Embodiments described herein relate generally to an illumination device.

BACKGROUND

For example, a light emitting device in which a first semiconductor laser element which is red light, a second semiconductor laser element which emits green light and a third semiconductor laser element which emits blue light are included in one package is suggested. This light emitting device can be applied to, for example, an illumination device (backlight device) which illuminates a liquid crystal panel.

In recent years, there is a further increasing need for the reduction in the thickness of liquid crystal display devices. The reduction in the thickness of illumination devices is required.

DETAILED DESCRIPTION

Figure 1:
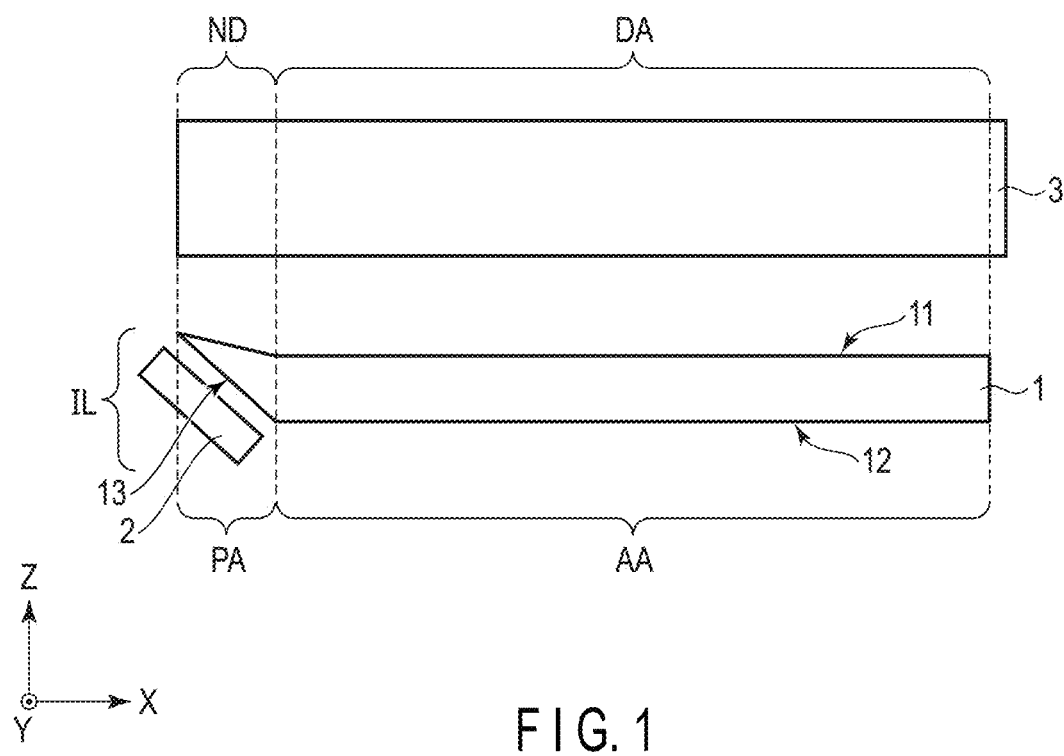
FIG. 1 is a diagram for explaining an illumination device IL according to an embodiment.

In general, according to one embodiment, an illumination device comprises a light guide comprising an upper surface, a lower surface facing the upper surface, and a light entering surface connecting the upper surface and the lower surface, a first light emitting portion configured to emit light having a first wavelength range, a second light emitting portion configured to emit light having a second wavelength range different from the first wavelength range, and a third light emitting portion configured to emit light having a third wavelength range different from the first wavelength range and the second wavelength range. The upper surface includes a first surface connected to the light entering surface, a second surface spaced apart from the first surface, located between the first surface and the lower surface in a thickness direction of the light guide and parallel to the first surface, a third surface spaced apart from the second surface, located between the second surface and the lower surface in the thickness direction and parallel to the second surface, and a fourth surface. The first surface, the second surface, the third surface and the fourth surface are arranged in this order in a first direction. Regarding a width in the first direction, a width of the first surface is less than a width of the second surface, and the width of the second surface is less than a width of the third surface. The lower surface includes a fifth surface facing the fourth surface and parallel to the fourth surface. An angle between the light entering surface and the first surface is an acute angle. The first light emitting portion, the second light emitting portion and the third light emitting portion face the light entering surface and are arranged in this order in the first direction.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as an X-direction or a first direction. A direction parallel to the Y-axis is referred to as a Y-direction or a second direction. A direction parallel to the Z-axis is referred to as a Z-direction or third direction. The plane defined by the X-axis and the Y-axis is referred to as an X-Y plane. The plane defined by the X-axis and the Z-axis is referred to as an X-Z plane. When the X-Y plane is viewed, the appearance is defined as a plan view. The first direction Z and the second direction Y are equivalent to directions parallel to the main surfaces of a light guide included in an illumination device. The third direction Z is equivalent to the thickness direction of the light guide.

FIG. 1 is a diagram for explaining an illumination device IL according to an embodiment.

The illumination device IL comprises a light guide 1 and a light emitting device 2. The light guide 1 or the light emitting device 2 shown in FIG. 1 does not accurately reflect its shape.

The details of the light guide are described later. The light guide 1 comprises an upper surface 11 facing an illumination target object 3 in the third direction Z, a lower surface 12 facing the upper surface 11, and a light entering surface 13 connecting the upper surface 11 and the lower surface 12.

The upper surface 11 comprises a main surface (a fourth surface as described later) which is a flat surface extending in the first direction X. The lower surface 12 comprises a main surface (a fifth surface as described later which is a flat surface extending in the first direction X. An area in which these main surfaces face each other corresponds to the effective area AA of the light guide 1. The effective area AA is an area from which the light which propagated through the light guide 1 is emitted. An area including the light entering surface 13 and located outside the effective area AA corresponds to the peripheral area PA of the light guide 1.

The light emitting device 2 is located at an end side of the light guide 1 in the first direction X and faces the light entering surface 13. The details of the light emitting device 2 are described later. The light emitting device 2 comprises light emitting portions each configured to emit light having a predetermined wavelength range.

The illumination target object 3 is, for example, a display panel. The display panel is, for example, a display panel (liquid crystal panel) comprising a liquid crystal layer, a display panel comprising on electrophoretic element, or a display panel to which micro-electromechanical systems (MEMS) are applied. This display panel comprises a display area DA which displays an image, a non-display area ND located outside the display area DA. The display area DA faces the effective area AA in the third direction Z. The non-display area ND faces the peripheral area PA.

When the illumination target object 3 is a transmissive display panel which displays an image by selectively transmitting illumination light, the illumination device IL functions as a backlight device. When the display panel is a reflective display panel which displays an image by selectively reflecting illumination light, the illumination device IL functions as a frontlight device.

By combining the illumination device IL of the present embodiment with the display panel which is the illumination target object 5, a display device can be configured.

Figure 2:
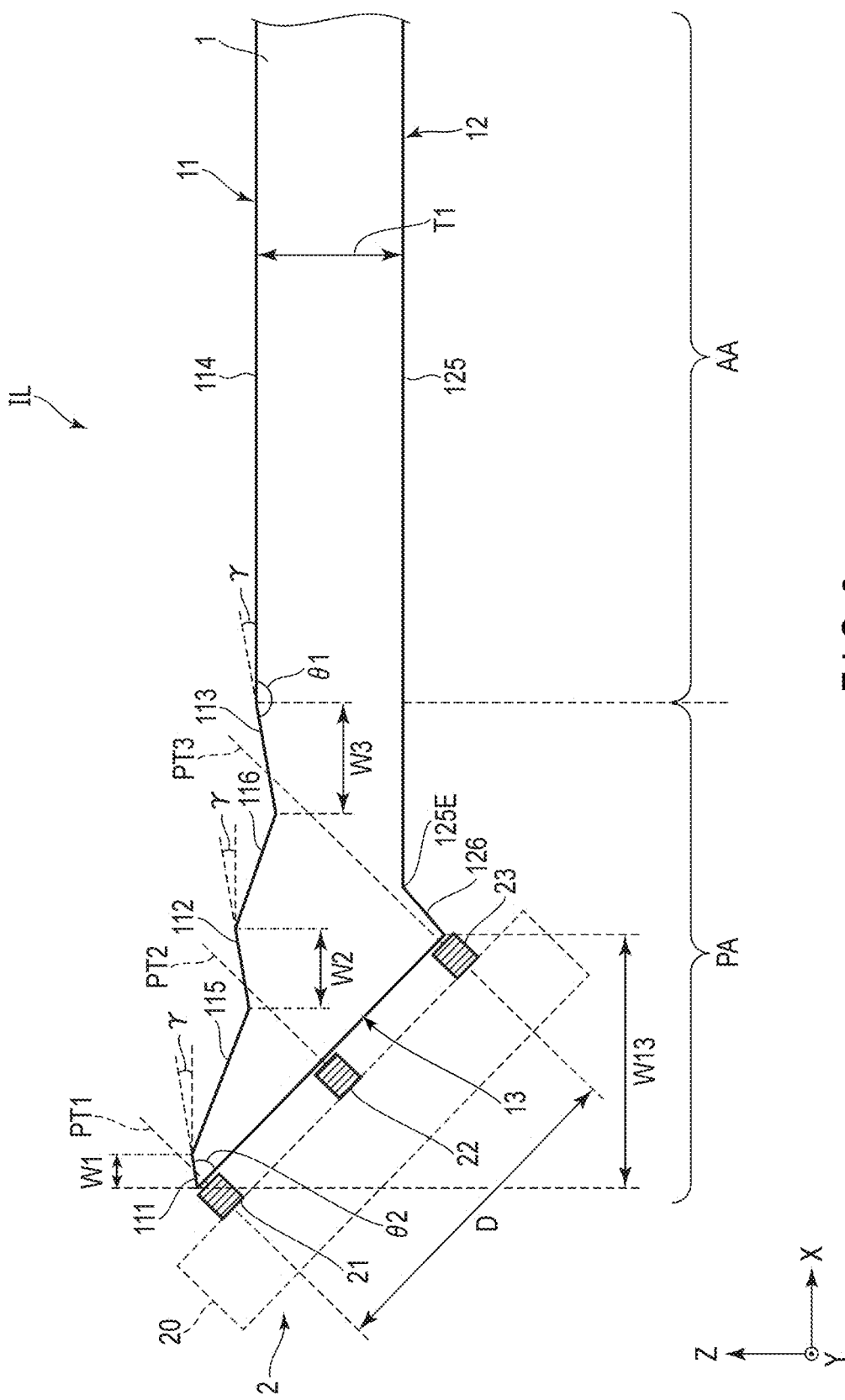
FIG. 2 is a cross-sectional view showing an example of the illumination device IL shown in FIG. 1.

FIG. 2 is cross-sectional view showing an example of the illumination device IL shown in FIG. 1. In FIG. 2, the peripheral area PA of the light guide 1 is enlarged.

First, the light guide 1 is explained.

The light guide 1 is formed of a resinous material such as polycarbonate or acrylic. However, the light guide may be formed of glass.

The upper surface 11 of the light guide 1 comprises a first surface 111, a second surface 112 spaced apart from the first surface 111, a third surface 113 spaced apart from the second surface 112, a fourth surface 114 adjacent to the third surface 113, a first connection surface 115 connecting the first surface 111 and the second surface 112, and a second connection surface 116 connecting the second surface 112 and the third surface 113. Each of these surfaces 111 to 116 is a flat surface.

The first surface 111, the first connection surface 115, the second surface 112, the second connection surface 116, the third surface 113 and the fourth surface 114 are arranged in this order in the first direction. In the example shown in FIG. 2, the third surface 113 is directly connected to the fourth surface 114. However, another connection surface may be interposed between the third surface 113 and the fourth surface 114. The first surface 111, the first connection surface 115, the second surface 112, the second connection surface 116 and the third surface 113 are located in the peripheral area PA. The fourth surface 114 is located in the effective area AA.

Of the surfaces constituting the upper surface 11, the first surface 111 is the top surface in the third direction Z (the thickness direction of the light guide 1) and is the farthest surface from the lower surface 12. Of the surfaces constituting the upper surface 11, the first surface 111 is the farthest surface from the effective area AA in the first direction X. The first surface 111 is located at an end side of the peripheral area PA in the first direction X. The first surface 111 has width W1 in the first direction X.

The second surface 112 is located between the first surface and the lower surface 12 in the third direction Z. The second surface 112 has width W2 in the first direction X. Width W2 is greater than width W1 (W2>W1).

The third surface 113 is located between the second surface 112 and the lower surface 12 the third direction Z. The third surface 113 is located at the other end side of the peripheral area PA in the first direction X. The third surface 113 has width W3 in the first direction X. Width W3 is greater than width W2 (W3>W2).

The first surface 111, the second surface 112 and the third surface 113 are parallel to each other. The fourth surface 114 is a surface parallel to the X-Y plane. When the fourth surface 114 is a reference surface, the first surface 111, the second surface 112 and the third surface 113 have the same inclination γ. For example, inclination γ is greater than or equal to 0° and less than or equal to 15°. When inclination γ is 0°, the third surface 113 and the fourth surface 114 form the same continuous plane.

When inclination γ is 0°, angle θ1 between the third surface 113 and the fourth surface 114 is 180°. Angle θ1 is decreased as inclination γ is increased. For example, angle θ1 is greater than or equal to 165° and less than or equal to 180°.

When the fourth surface 114 is a reference surface, the first connection surface 115 and the second connection surface 116 are inclined surfaces which incline with respect to the fourth surface 114. The first connection surface 115 and the second connection surface 116 are parallel to each other. It should be noted that the first connection surface 115 and the second connection surface 116 may not be parallel to each other.

The lower surface 12 of the light guide 1 comprises a fifth surface 125, and a connection surface 126 connecting the fifth surface 125 and the light entering surface 13. Each of these surfaces 125 and 126 is a flat surface.

The fifth surface 125 faces the fourth surface 114 in the third direction Z. The fifth surface 125 is a surface parallel to the X-Y plane and is parallel to the fourth surface 114. The fifth surface 125 extends over the effective area AA and the peripheral area PA. The light guide 1 has thickness T1 in the third direction Z between the fourth surface 114 and the fifth surface 125 in the effective area AA.

In the peripheral area PA, the fifth surface 125 faces the third surface 113 and the second connection surface 116 in the third direction Z. An end portion 125E of the fifth surface 125 or the boundary between the fifth surface 125 and the connection surface 126 is located between the second surface 112 and the third surface 113 is the first direction X. The end portion 125E faces the second connection surface 116 in the third direction Z.

The light entering surface 13 of the light guide 1 is a flat surface and is an inclined surface which inclines with respect to the fourth surface 114, the fifth surface 125 or the X-Y plane. The light entering surface 13 is connected to the first surface 111 and the connection surface 126. The connection location of the light entering surface 13 and the first surface 111 is at the end side of the peripheral area PA in the first direction X. Angle θ2 between the light entering surface 13 and the first surface 111 is an acute angle (less than 90°). The light entering surface 13 faces the first surface 111, the first connection surface 115 and the second surface 112 in the third direction Z.

The light entering surface 13 has width W13 in the first direction X. Width W13 is greater than thickness T1 (W13>T1). Thickness T1 is less than or equal to 1.5 mm. For example, thickness T1 is 1.0 mm.

Now, this specification explains the light emitting device 2.

The light emitting device 2 comprises a first light emitting portion 21, a second light emitting portion 22 and a third light emitting portion 23. The first light emitting portion 21, the second light emitting portion 22 and the third light emitting portion 23 are mounted on the circuit board 20 shown by broken lines. The first light emitting portion 21, the second light emitting portion 22 and the third light emitting portion 23 face the light entering surface 13 and are arranged in this order in the first direction X. Each of the first light emitting portion 21, the second light emitting portion 22 and the third light emitting portion 23 is configured to emit light toward the light entering surface 13. The details are as follows.

The first light emitting portion 21 is configured to emit light having first wavelength range (first emission light). For example, the first wavelength range is a red wavelength range. The first light emitting portion 21 comprises a first semiconductor laser element which emits red light.

The second light emitting portion 22 is configured to emit light having a second wavelength range (second omission light). The second wavelength range is different from the first wavelength range. For example, the second wavelength range is a green wavelength range. The second light emitting portion 22 comprises a second semiconductor laser element which emits green light.

The third light emitting portion 23 is configured to emit light having a third wavelength range (third emission light). The third wavelength range is different from the first wavelength range or the second wavelength range. For example, the third wavelength range is a blue wavelength range. The third light emitting portion 23 comprises a third semiconductor laser element which emits blue light.

The distance D from the first light emitting portion 21 to the third light emitting portion 23 along the light entering surface 13 is greater than thickness T1 of the light guide 1 (D>T1).

The light emitting device 2 is not limited to a case where it comprises three types of light emitting portions. The light emitting device 2 may comprise two, four or more types of light emitting portions. The combination of colors of light emitted from the light emitting portions is not limited to the three colors of red, green and blue. For example, one or two colors of red, green and blue may be adopted. Alternatively, a color different from red, green or blue may be included.

Now, this specification more specifically explains the first surface 111, the second surface 112 and the third surface 113.

The first surface 111 is located on a first optical path PT1 or the principal ray of the first emission light emitted from the first light emitting portion 21. The first optical path PT1 is orthogonal to the light entering surface 13. In addition to the principal ray, the first omission light includes diffused light which diffuses at a diffusion angle δ with respect to the principal ray.

The first surface 111 is a total-reflection surface configured to totally reflect the first emission light. In other words, the first surface 111 has inclination γ which is set so as to totally reflect substantially the whole first emission light including the principal ray and diffused light.

The second surface 112 is located on a second optical path PT2 of the principal ray of the second emission light emitted from the second light emitting portion 22. The second optical path PT2 is orthogonal to the light entering surface 13 and parallel to the first optical path PT1. In addition to the principal ray, the second emission light includes diffused light which diffuses at a diffusion angle δ with respect to the principal ray. The length of the second optical path PT2 from the second light emitting portion 22 to the second surface 112 is greater than that of the first optical path PT1 from the first light emitting portion 21 to the first surface 111.

The second surface 112 is a total-reflection surface configured to totally reflect the second emission light. In other words, the second surface 112 has inclination γ which is set so as to totally reflect substantially the whole second emission light including the principal ray and diffused light. As described above, the second surface 112 is parallel to the first surface 111 and has the same inclination γ as the first surface 111.

The third surface 113 is located on a third optical path PT3 of the principal ray of the third emission light emitted from the third light emitting portion 23. The third optical path PT3 is orthogonal to the light entering surface 13 and parallel to the second optical path PT2. In addition to the principal ray, the third emission light includes diffused light which diffuses at a diffusion angle δ with respect to the principal ray. The length of the third optical path PT3 from the third light emitting portion 23 to the third surface 113 is greater than that of the second optical path PT2 from the second light emitting portion 22 to the second surface 112.

The third surface 113 is a total-reflection surface configured to totally reflect the third emission light. In other words, the third surface 113 has inclination γ which is set so as to totally reflect substantially the whole third emission light including the principal ray and diffused light. As described above, the third surface 113 is parallel to the first surface 111 and has the same inclination γ as the first surface 111.

Figure 3:
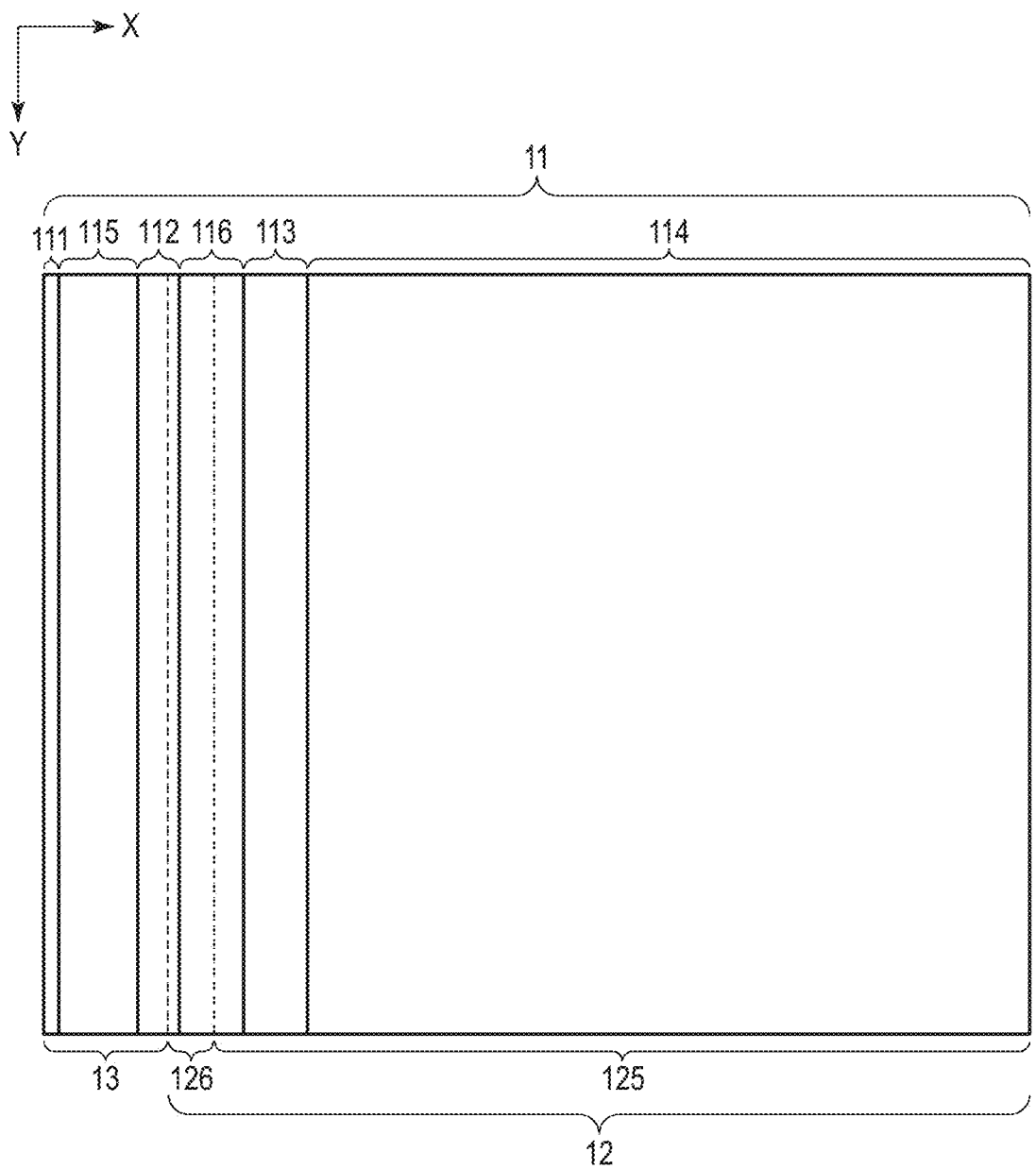
FIG. 3 is a plan view of the light guide 1 shown in FIG. 2.

FIG. 3 is a plan view of the light guide 1 shown in FIG. 2.

In the upper surface 11, each of the first surface 111, the second surface 112, the third surface 113, the first connection surface 115 and the second connection surface 116 is formed in a rectangular shape extending in the second direction Y as seen in plan view. The fourth surface 114 has a maximum area in the upper surface 11.

Each of the connection surface 126 of the lower surface 12 and the light entering surface 13 is also formed in a rectangular shape extending in the second direction Y as seen in plan view. The fifth surface 125 has a maximum area in the lower surface 12.

Figure 4:
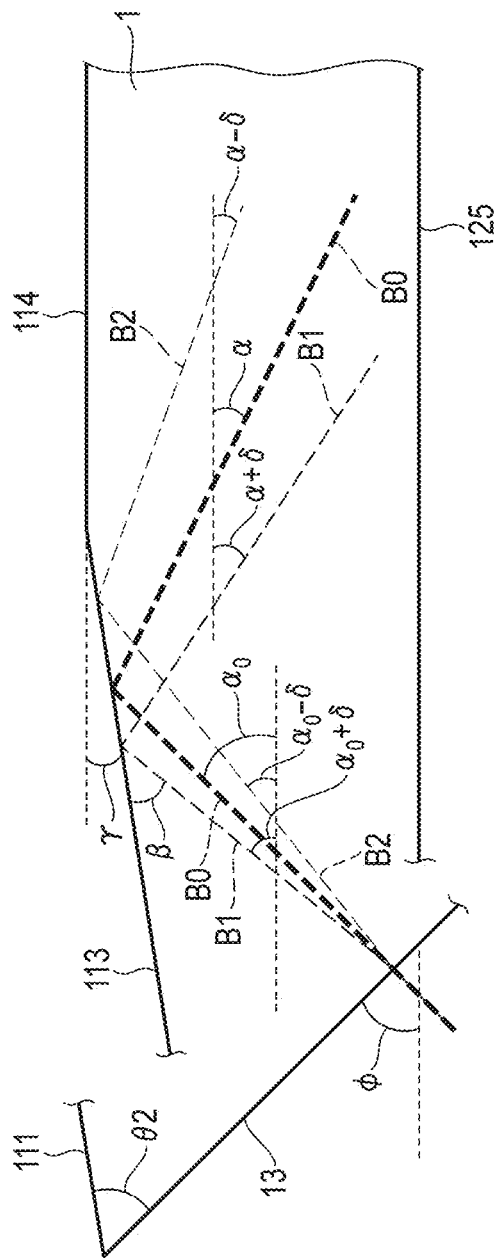
FIG. 4 is a diagram for explaining a total-reflection surface.

FIG. 4 is a diagram for explaining a total-reflection surface. Here, of the total-reflection surfaces described above, the third surface 113 is taken as an example to explain, inclination γ. The angle on an optical path explained below is shown as the angle between the fourth surface 114 and the optical path.

As explained above, the third emission light which entered the light from the light entering surface 13 includes principal ray B0, and diffused light rays B1 and B2 which diffuse at a diffusion angle δ. The angle of the optical path of principal ray B0 from the light entering surface 13 to the third surface 113 is defined as α0. The angle of the optical path of diffused light ray B1 from the light entering surface 13 to the third surface 113 is defined as (α0+δ). The angle of the optical path of diffused light ray B2 from the light entering surface 13 to the third surface 113 is defined as (α0−δ). The angle of the optical path of principal ray B0 reflected on the third surface 113 is defined as α. The angle of the optical path of diffused light ray B1 reflected on the third surface 113 is defined as (α+δ). The angle of the optical path of diffused light ray B2 reflected on the third surface 113 is defined as (α−δ).

To totally reflect the third emission light on the third surface 113, angle β between the optical path of diffused light ray B1 and the third surface 113 needs to satisfy the condition of total reflection shown below.

$$\beta < 90° - \theta c \quad (1)$$

Here, θc is a critical angle. When the refractive index of air is 1, and the refractive index of the light guide 1 is 1.5, the critical angle θc is 41.8°.

β is equal to (α+δ+γ).

For example, when α is 26.5°, and δ is 6.5°, the range of inclination γ is as follows.

$$\gamma < 15.2°$$

Thus, inclination γ should be preferably less than or equal to 15°.

At this time, (α+δ) is 33°, and (α−δ) is 20°.

The relationship between α0 and α is as follows.

$$\alpha 0 = \alpha + 2\gamma$$

When is γ is 9°, α0 is 44.5°, and (α0+δ) is 51°, and (α0−δ) is 38°, and β is 42°.

When the light entering surface 13 is orthogonal to the optical path of principal ray B0, φ of the light entering surface 13 is 45.5°. Angle θ2 between the first surface 111 and the light entering surface 13 is 54.5°.

Figure 5:
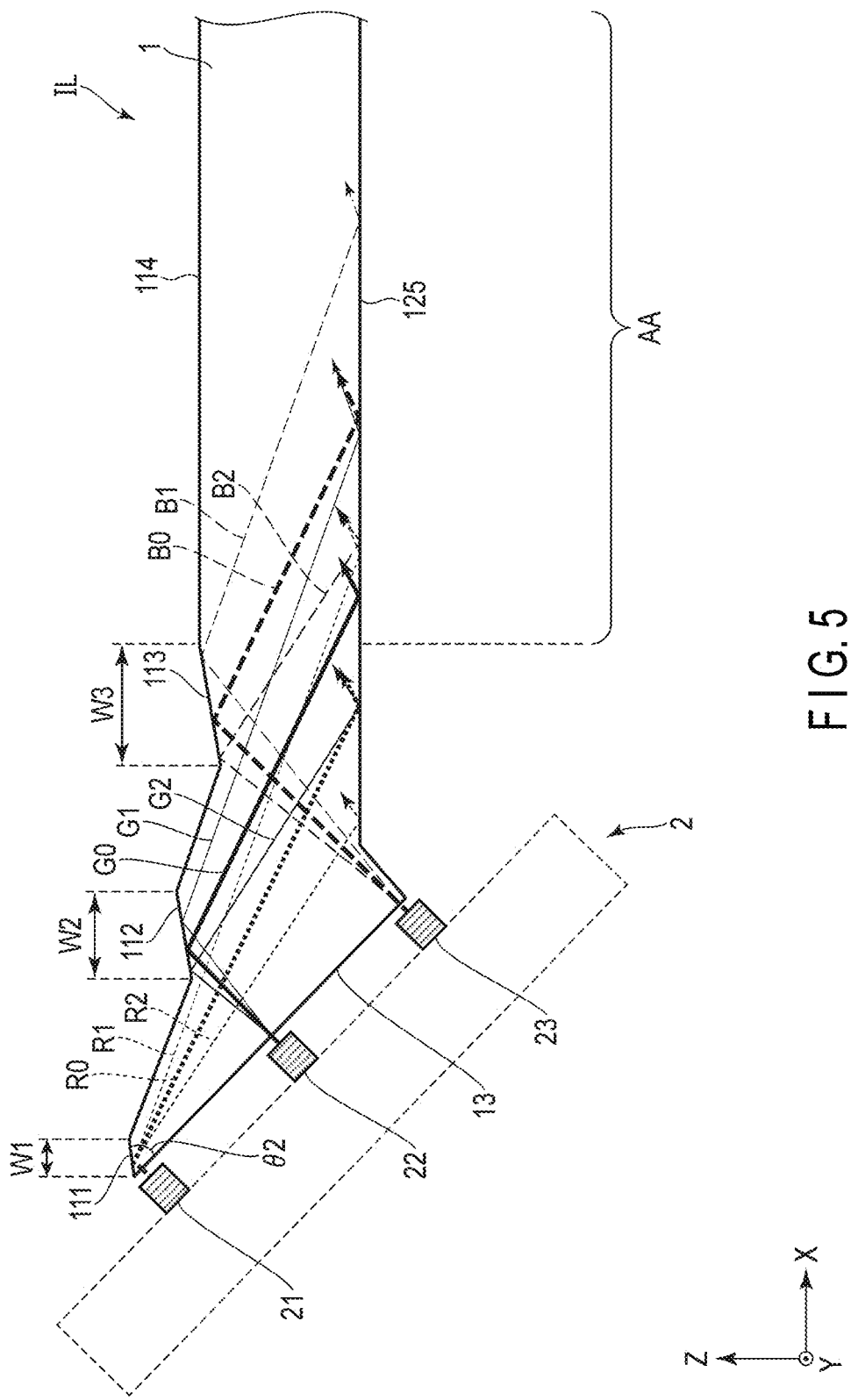
FIG. 5 is a cross-sectional view showing an example of the illumination device IL.

FIG. 5 is a cross-sectional view showing an example of the illumination device IL. In the example shown in FIG. 5, inclinations γ of all of the first surface 111, the second surface 112 and the third surface 113 are 9°.

The emission light (R) emitted from the first light omitting portion 21, the emission light (G) emitted from the second light emitting portion 22 and the emission light (B) emitted from the third light emitting portion 23 enter the light guide 1 via the light entering surface 13. The emission light including principal ray R0 and diffused light rays R1 and R2 is reflected on the first surface 111. The emission light including principal ray G0 and diffused light rays G1 and G2 is reflected on the second surface 112. The emission light including principal ray B0 and diffused light rays B1 and B2 is reflected on the third surface 113. The reflected light of each color propagates through the light guide 1 while the light is reflected on the fifth surface 125 and the fourth surface 114. Of the light propagating through the light guide 1, the light which does not satisfy the condition of total reflection is emitted from the fourth surface 114 in the effective area AA.

Figure 6:
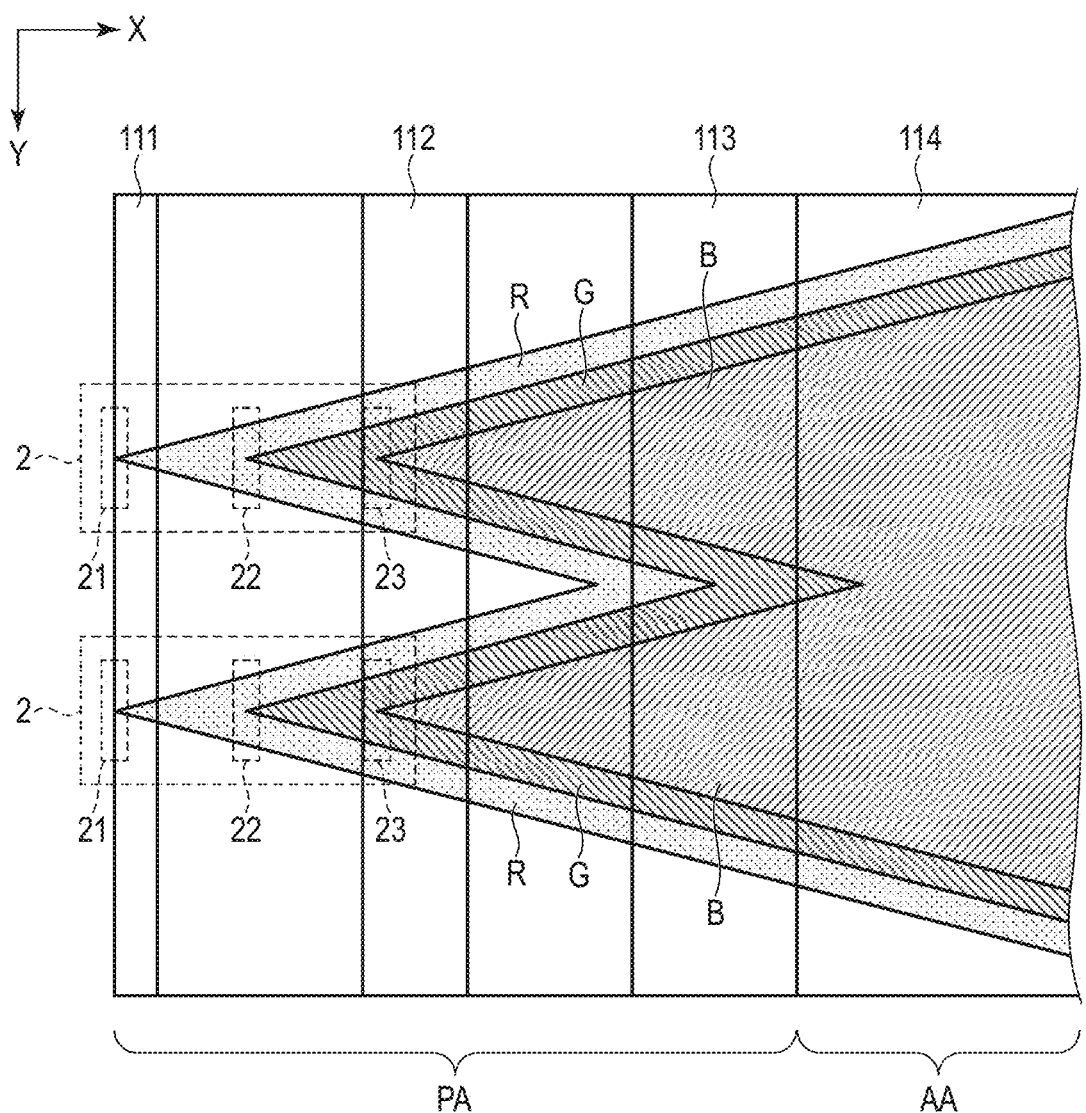
FIG. 6 is a plan view showing an example of the illumination device IL.

FIG. 6 is a plan view showing an example of the illumination device IL.

As seen in plan view, in the peripheral area PA of the light guide 1, the emission light emitted from the first light emitting portion 21, the emission light G emitted from the second light emitting portion 22 and the emission light B emitted from the third light emitting portion 23 propagate in the first direction X, are mixed with each other and form illumination light. In the effective area AA, the illumination light emitted from each of the light emitting devices 2 adjacent to each other in the second direction Y propagates in the first direction X, expands in the second direction Y and is mixed with the other.

FIG. 6 schematically shows how each of the emission light R, the emission light G and the emission light B expands. It should be noted that the emission light R, the emission light G and the emission light B may differ from each other regarding the degree of expansion or the directivity in the X-Y plane. When the emission light R, the emission light G and the emission light B have different directivities, a light omitting portion which emits light having a high directivity (difficult to expand) should be preferably provided in a location far from the effective area AA, and a light emitting portion which emits light having a low directivity (easy to expand) should be preferably provided in a location rear the effective area AA. In the example shown in FIG. 6, it is possible to apply a combination in which the directivity of the light emitted from the first light emitting portion 21 is high and the directivity of the light emitted from the third light emitting portion 23 is low.

According to the illumination device IL described above, the distance required to mix different wavelengths of light in the first direction X can be shortened, compared to an edge light system in which the first light emitting portion 21, the second light emitting portion 22 and the third light emitting portion 23 arranged in the second direction Y face a side surface of the light guide 1. Thus, the length of the peripheral area PA in the first direction X can be shortened.

In addition, according to the illumination device IL described above, the thickness of the light guide 1 can be reduced, compared to another edge light system in which the first light emitting portion 21, the second light emitting portion 22 and the third light emitting portion 23 arranged in the third direction 7 face a side surface of the light guide 1.

In this way, the size of the illumination device IL can be reduced.

Further, the first surface 111, the second surface 112 and the third surface 113 are total-reflection surfaces. Thus, a reflective layer for reflecting the emission light of each color is unnecessary in the first surface 111, the second surface 112 or the third surface 113. Therefore, the cost of the illumination device IL can be reduced.

Figure 7:
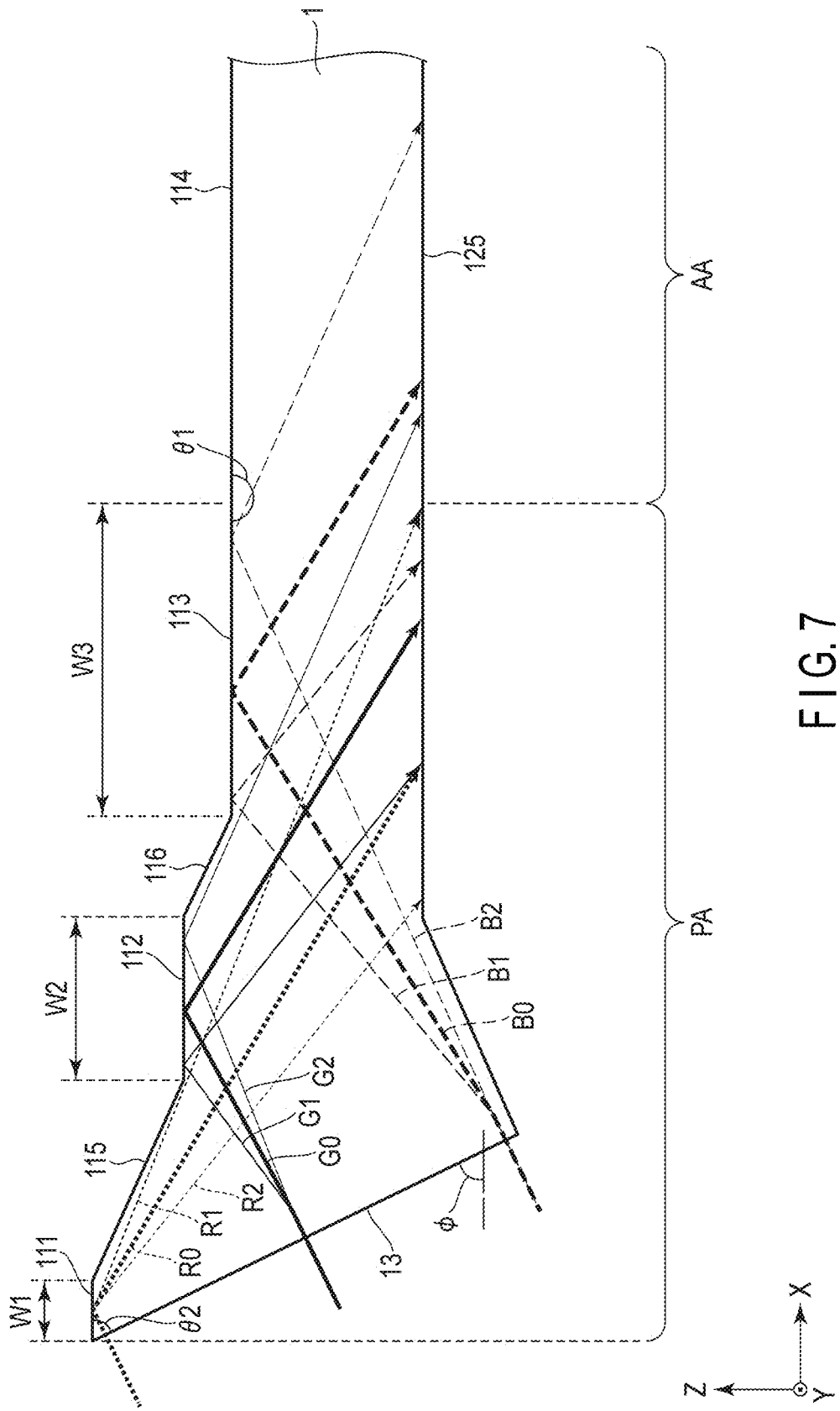
FIG. 7 is a diagram showing another example of the light guide 1 shown in FIG. 1.

FIG. 7 is a diagram showing another example of the light guide 1 shown in FIG. 1.

The light guide 1 of the example shown in FIG. 7 is different from the light guide 1 shown in FIG. 5 in respect that inclination γ is 0°. Thus, the first surface 111, the second surface 112 and the third surface 113 are parallel to the fourth surface 114 which is a reference surface. The third surface 113 and the fourth surface 114 form the same continuous plane. Angle θ1 between the third surface 113 and the fourth surface 114 is 180°.

The first surface 111 a total-reflection surface which reflects the emission light including principal ray R0 and diffused light rays R1 and R2. The second surface 112 is a total-reflection surface which reflects the emission light including principal ray G0 and diffused light rays G1 and G2. The third surface 113 is a total-reflection surface which reflects the emission light including principal ray B0 and diffused light rays B1 and B2. The optical paths of principal rays R0, G0 and B0 are parallel to each other.

The light entering surface 13 inclines so as to be orthogonal to the optical paths of principal rays R0, G0 and B0.

When angle α of the optical path of the principal ray which underwent total reflection is 26.5°, angle α0 of the optical path of the principal ray from the light entering surface 13 to the total reflection surface is 26.5°, and inclination of the light entering surface 13 is 63.5°. Angle θ2 between the first surface 111 and the light entering surface 13 is 63.5°.

When the light guide 1 of the example shown in FIG. 5 is compared to the light guide 1 of the example shown in FIG. 7, as inclination γ is decreased, width W1 of the first surface 111, width W2 of the second surface 112 and width W3 of the third surface 113 are increased, and further, angle θ2 is increased.

Figure 8:
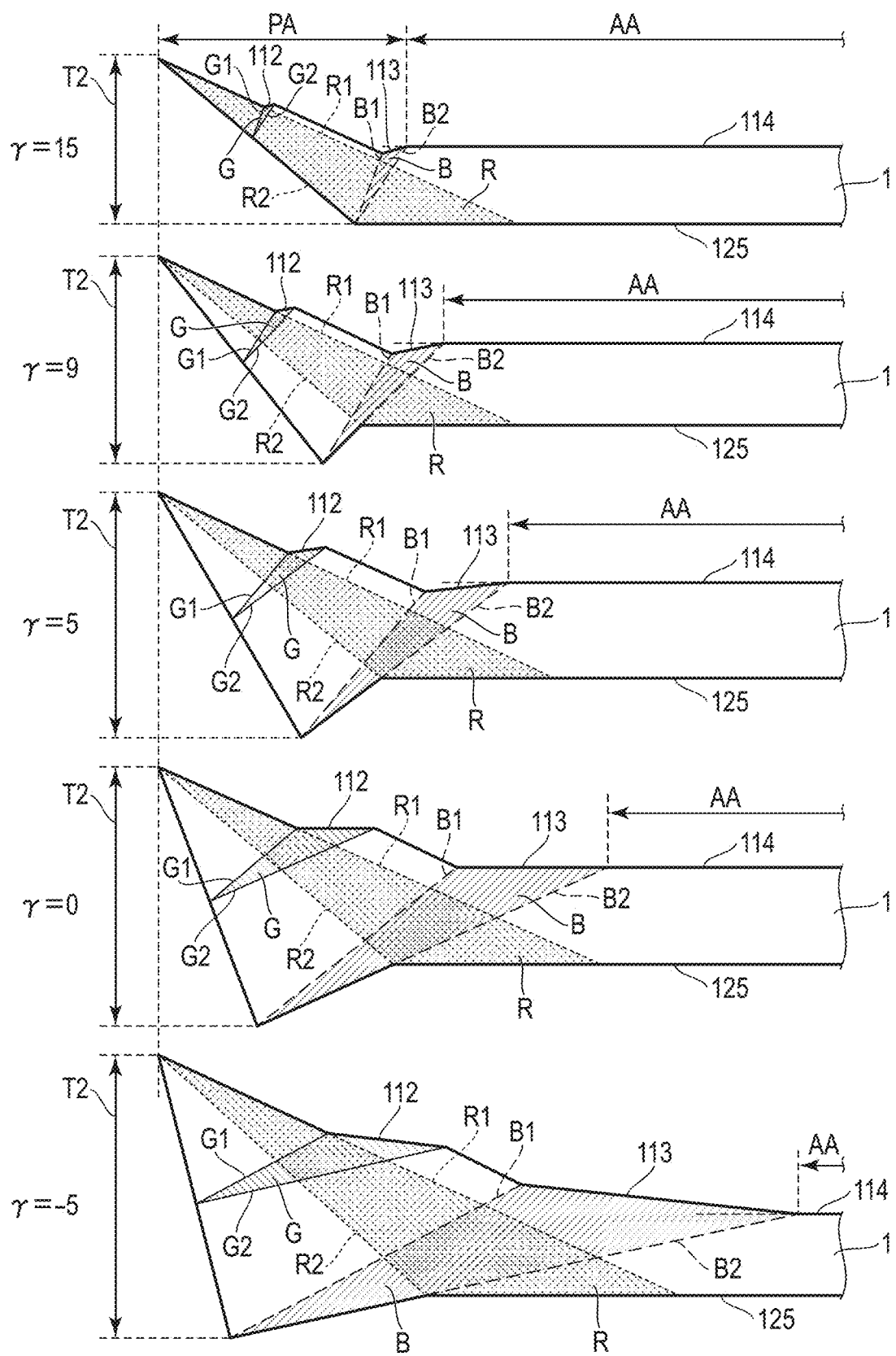
FIG. 8 is a diagram showing other examples of the light guide 1 shown in FIG. 1.

FIG. 8 is a diagram showing other examples of the light guide 1 shown in FIG. 1. FIG. 8 shows the cross-sectional surfaces of some light guides 1 having different inclinations γ. In FIG. 8, the illustration of the first surface is omitted. FIG. 8 shows a light guide 1 in which inclination γ is 15°, a light guide 1 in which inclination γ is 9°, a light guide 1 in which inclination γ is 5°, a light guide 1 in which inclination γ is 0°, and a light guide 1 in which inclination γ is −5°.

The shape of each light guide 1 shown in the figure is optimized so as to satisfy the following conditions. The emission light R reflected on the first surface leaches the fifth surface 125. The emission light G is reflected on the second surface 112, and further, the reflected light reaches the fifth surface 125. The emission light is reflected on the third surface 113, and further, the reflected light reaches the fifth surface 125.

When the light guides 1 having the shapes optimized with the above conditions are compared to each other, as inclination γ is increased, the peripheral area PA can be reduced. Further, as inclination γ is decreased, thickness T2 of the peripheral area PA is increased. In consideration of these matters, inclination γ should be preferably greater than or equal to 0°.

Figure 9:
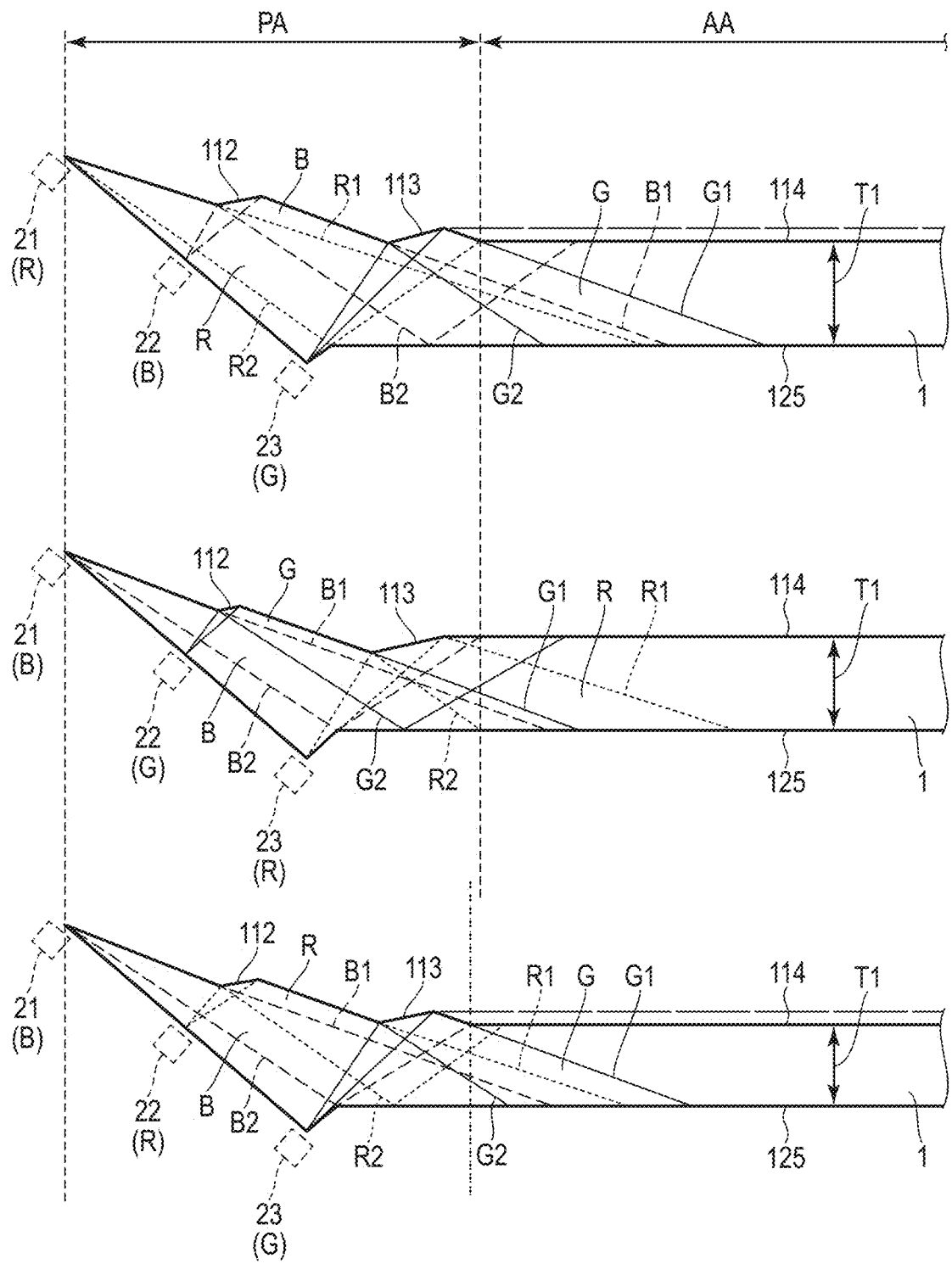
FIG. 9 is a diagram showing other examples of the light guide 1 shown in FIG. 1.

FIG. 9 is a diagram showing other examples of the light guide 1 shown in FIG. 1. FIG. 9 shows the cross-sectional surfaces of some light guides 1. In FIG. 9, the illustrating of the first surface is omitted.

In the examples shown in FIG. 9, the diffusion angles δ angles of the emission light emitted from the first light emitting portion 21, the second light emitting portion 22 and the third light emitting portion 23 are different from each other. In this case, inclinations γ of the first surface 111, the second surface 112 and the third surface 113 are determined used on the largest diffusion angle δ.

Here, this specification explains a case where the diffusion angle δ of the emission light R is the largest and the diffusion angle δ of the emission light G is the smallest. In this case, inclinations γ are determined based on the diffusion angle γ of the emission light R. For example, the diffusion angle δ of the emission light G is 6.5°. The diffusion angle δ of the emission light B is 6.7°. The diffusion angle δ of the emission light R is 8.8°.

When the refractive index of air is 1, and the refractive index of each light guide 1 is 1.5, and critical angle θc is 41.8°, and α is 26.3°, and δ is 8.8°, the range of inclination γ based on the relational equation (1) explained with reference to FIG. 4 is as follows.

$$\gamma < 12.9°$$

The shape of each light guide 1 shown in FIG. 9 is optimized so as to satisfy the following conditions. Each light guide 1 satisfies the condition in which inclination γ is less than 12.9°. The emission light R reflected on the first surface reaches the fifth surface 125. The emission light G is reflected on the second surface 112, and further, the reflected light reaches the fifth surface 125. The emission light B is reflected on the third surface 113, and further, the reflected light reaches the fifth surface 125.

In the example shown in the upper stage of FIG. 9, the first light emitting portion 21 is configured to emit the emission light R having the first wavelength range which is a red wavelength range. The second light emitting portion 22 is configured to emit the emission light B having the second wavelength range which is a blue wavelength range. The third light emitting portion 23 is configured to emit the emission light G having the third wavelength range which is a green wavelength range.

In the example shown in the middle stage of FIG. 9, the first light emitting portion 21 is configured to emit the emission light B having the first wavelength range which is a blue wavelength range. The second light emitting portion 22 is configured to emit the emission light G having the second wavelength range which is a green wavelength range. The third light emitting portion 23 is configured to emit the emission light R having the third wavelength range which is a red wavelength range.

In the example shown in the lower stage of FIG. 9, the first light emitting portion 21 is configured to emit the emission light B having the first wavelength range which is a blue wavelength range. The second light emitting portion 22 is configured to emit the emission light R having the second wavelength range which is a red wavelength range. The third light emitting portion 23 is configured to emit the emission light G having the third wavelength range which is a green wavelength range.

According to the result of the comparison of the light guides 1 having the shapes optimized with the above conditions, when the diffusion angle of the emission light emitted from the second light emitting portion 22 is greater than the diffusion angle of the light emitted from the first light emitting portion 21 and the diffusion angle of the light emitted from the third light emitting portion 23 (in the example shown in the lower stage of FIG. 9), the peripheral area PA can be made small, and further, thickness T1 in the effective area AA can be reduced.

Figure 10:
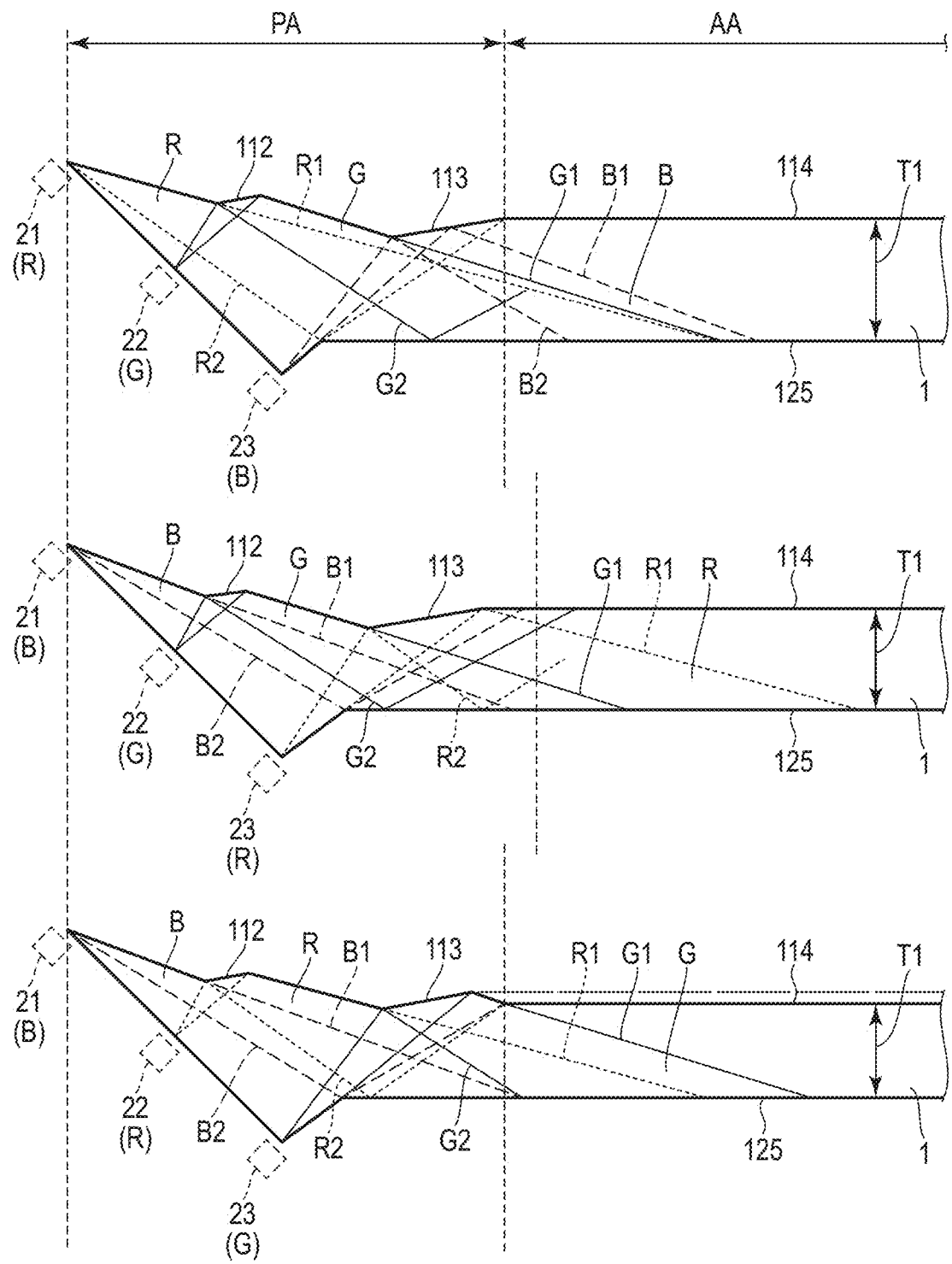
FIG. 10 is a diagram showing other examples of the light guide 1 shown in FIG. 1.

FIG. 10 is a diagram showing other examples of the guide 1 shown in FIG. 1. FIG. 10 shows the cross-sectional surfaces of some light guides 1. In FIG. 10, the illustration of the first surface is omitted.

In the examples shown in FIG. 10, this specification explains a case where the diffusion angle δ of the emission light R is the largest and the diffusion angle δ of the emission light B is the smallest. In this case, inclinations γ are determined based on the diffusion angle δ of the emission light R. For example, the diffusion angle δ of the emission light G is 7.5°. The diffusion angle δ of the emission light B is 5°. The diffusion angle δ of the emission light R is 10°.

When the refractive index of air is 1, and the refractive index of each light guide 1 is 1.5, and critical angle θc is 41.8°, and α is 26.5°, and δ is 10°, the range of inclination γ based on the relational equation (1) explained with reference to FIG. 4 is as follows.

$$\gamma < 11.7°$$

The shape of each light guide 1 shown in FIG. 10 is optimized so as to satisfy the following conditions. Inclination γ is 11°. The emission light R reflected on the first surface reaches the fifth surface 125. The emission light G is reflected on the second surface 112, and further, the reflected light reaches the fifth surface 125. The emission light B is reflected on the third surface 113, and further, the reflected light reaches the fifth surface 125.

In the example shown in the upper stage of FIG. 10, the first light emitting portion 21 is configured to emit the emission light R having the first wavelength range which is a red wavelength range. The second light emitting portion 22 is configured to emit the emission light G having the second wavelength range which is a green wavelength range. The third light emitting portion 23 is configured to emit the emission light B having the third wavelength range which is a blue wavelength range.

In the example shown in the middle stage of FIG. 10, the first light emitting portion 21 is configured to emit the emission light B having the first wavelength range which is a blue wavelength range. The second light emitting portion 22 is configured to emit the emission light G having the second wavelength range which is a green wavelength range. The third light emitting portion 23 is configured to emit the emission light having the third wavelength range which is a red wavelength range.

In the example shown in the over stage of FIG. 10, the first light emitting portion 21 is configured to emit the emission light B having the first wavelength range which is a blue wavelength range. The second light emitting portion 22 is configured to emit the emission light having the second wavelength range which is a red wavelength range. The third light emitting portion 23 is configured to emit the emission light G having the third wavelength range which is a green wavelength range.

According to the result of the comparison of the high guides 1 having the shapes optimized with the above conditions, when the diffusion angle of the emission light emitted from the second light emitting portion 22 is greater than the diffusion angle of the light emitted from the first light emitting portion 21 and the diffusion angle of the light emitted from the third light emitting portion 23 (in the example shown in the lower stage of FIG. 10), the peripheral area PA can be made small, and further, thickness T1 in the effective area AA can be reduced.

The embodiment described above can provide an illumination device in which the size can be reduced.

All of the illumination devices that can be implemented by a person of ordinary skill in the art through arbitrary design changes to the illumination device described above as the embodiment of the present invention come within the scope of the present invention as long as they are in keeping with the spirit of the present invention.

Various modification examples which may be conceived by a person of ordinary skill in the art in the scope of the idea of the present invention will also fail within the scope of the invention. For example, even if a person of ordinary skill in the art arbitrarily modifies the above embodiment by adding or deleting a structural element or changing the design of a structural element, or by adding or omitting a step or changing the condition of a step, all of the modifications fall within the scope of the present invention as long as they are in keeping with the spirit of the invention.

Further, other effects which may be obtained from the above embodiment and are self-explanatory from the descriptions of the specification or can be arbitrarily conceived by a person of ordinary skill in the art are considered as the effects of the present invention as a matter of course.

What is claimed is:

1. An illumination device comprising:
a light guide comprising an upper surface, a lower surface facing the upper surface, and a light entering surface connecting the upper surface and the lower surface;
a first light emitting portion configured to emit light having a first wavelength range;
a second light emitting portion configured to emit light having a second wavelength range different from the first wavelength range; and
a third light emitting portion configured to emit light having a third wavelength range different from the first wavelength range and the second wavelength range, wherein
the upper surface includes a first surface connected to the light entering surface, a second surface spaced apart from the first surface, located between the first surface and the lower surface in a thickness direction of the light guide and parallel to the first surface, a third surface spaced apart from the second surface, located between the second surface and the lower surface in the thickness direction and parallel to the second surface, and a fourth surface,
the first surface, the second surface, the third surface and the fourth surface are arranged in this order in a first direction,
regarding a width in the first direction, a width of the first surface is less than a width of the second surface, and the width of the second surface is less than a width of the third surface,
the lower surface includes a fifth surface facing the fourth surface and parallel to the fourth surface,
an angle between the light entering surface and the first surface is an acute angle, and
the first light emitting portion, the second light emitting portion and the third light emitting portion face the light entering surface and are arranged in this order in the first direction.

2. The illumination device of claim 1, wherein
when the fourth surface is a reference surface, an inclination of each of the first surface, the second surface and the third surface is less than or equal to 15°.

3. The illumination device of claim 1, wherein
the inclination is greater than or equal to 0°.

4. The illumination device of claim 2, wherein
the upper surface further includes a first connection surface connecting the first surface and the second surface, and a second connection surface connecting the second surface and the third surface and parallel to the first connection surface.

5. The illumination device of claim 1, wherein
an end portion of the fifth surface is located between the second surface and the third surface in the first direction.

6. The illumination device of claim 5, wherein
the light entering surface faces the first surface and the second surface in the thickness direction, and
the fifth surface faces the third surface in the thickness direction.

7. The illumination device of claim 1, wherein
the first surface is located on a first optical path of a principal ray of light emitted from the first light emitting portion,
the second surface is located on a second optical path of a principal ray of light emitted from the second light emitting portion, and
the third surface is located on a third optical path of a principal ray of light emitted from the third light emitting portion.

8. The illumination device of claim 7, wherein
the first optical path, the second optical path and the third optical path are parallel to each other.

9. The illumination device of claim 1, wherein
the first surface is a total-reflection surface configured to totally reflect the light emitted from the first light emitting portion,
the second surface is a total-reflection surface configured to totally reflect the light emitted from the second light emitting portion, and
the third surface is a total-reflection surface configured to totally reflect the light emitted from the third light emitting portion.

10. The illumination device of claim 1, wherein
a width parallel to the light entering surface from the first light emitting portion to the third light emitting portion is greater than a thickness between the fourth surface and the fifth surface.

11. The illumination device of claim 10, wherein the thickness is less than or equal to 1.5 mm.

12. The illumination device of claim 1, wherein a diffusion angle of the light emitted from the second light emitting portion is greater than a diffusion angle of the light emitted from the first light emitting portion and a diffusion angle of the light emitted from the third light emitting portion.

13. The illumination device of claim 12, wherein the second wavelength range is a red wavelength range.

* * * * *